Oct. 17, 1961  E. C. BUSCHMANN ET AL  3,005,098
X-RAY EMISSION ANALYSIS
Filed March 31, 1958  2 Sheets-Sheet 1
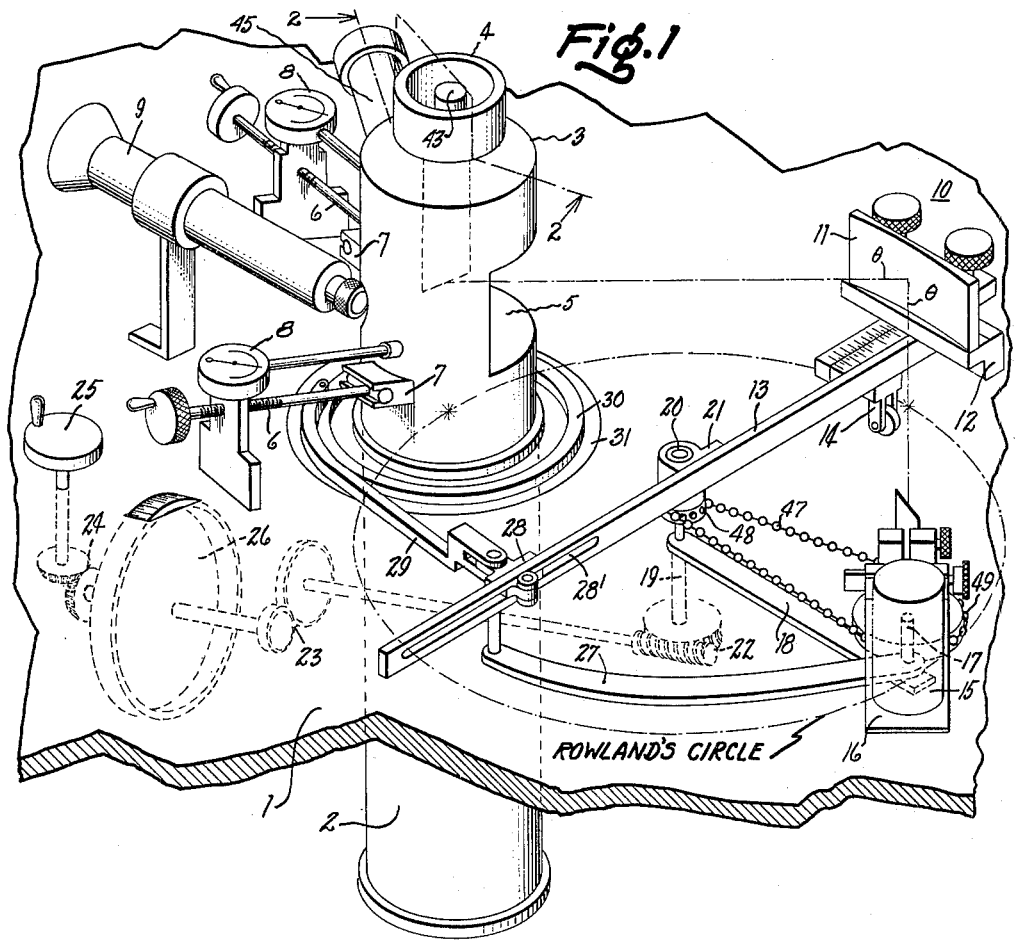
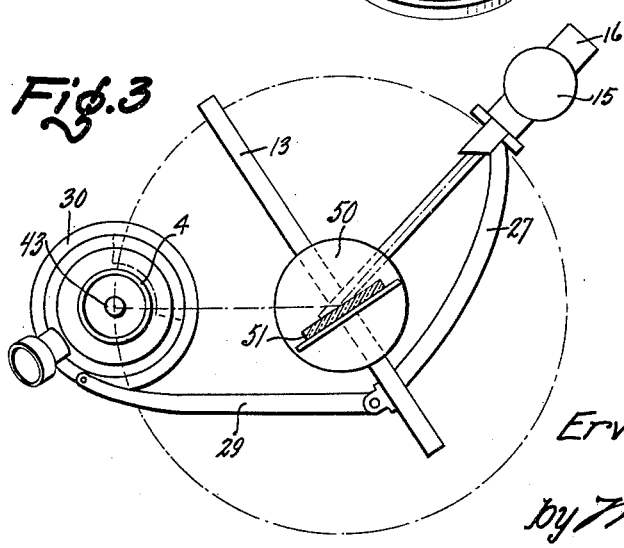
Inventors:
Erwin C. Buschmann,
James F. Norton,
by Merton D. Moore
Their Attorney

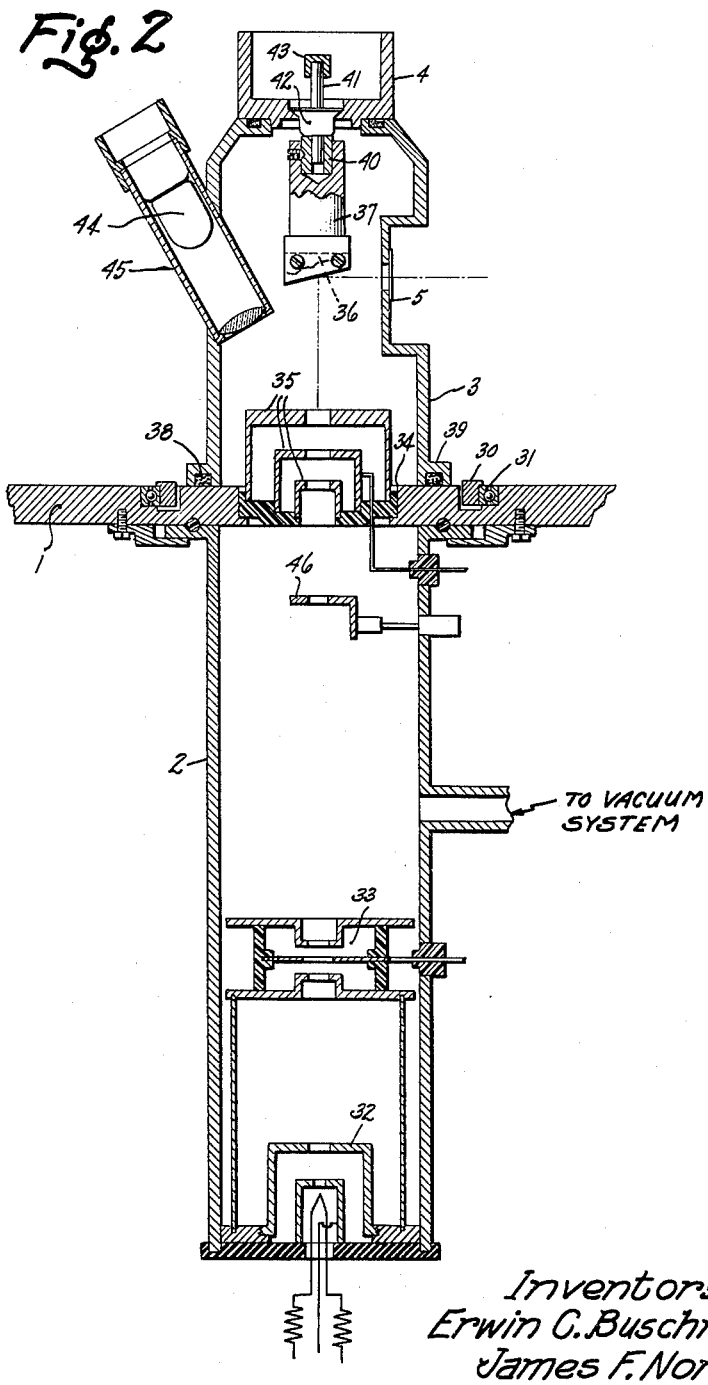

United States Patent Office 3,005,098
Patented Oct. 17, 1961

3,005,098
X-RAY EMISSION ANALYSIS
Erwin C. Buschmann and James F. Norton, Schenectady, N.Y., assignors to General Electric Company, a corporation of New York
Filed Mar. 31, 1958, Ser. No. 725,431
9 Claims. (Cl. 250—51.5)

This invention relates to an apparatus for determining the composition of a material by means of X-ray emission analysis and, more particularly, to an improved device wherein the entire surface of a sample may be accurately analyzed.

It is well known in the study of the properties and composition of materials that when such a material is bombarded by an intense beam of charged particles, such as electrons, it emits characteristic X-ray radiations, the spectral distribution of which is always identical for a given material. This technique for identifying the composition of a material by detecting the wavelength of the emitted X-rays to identify the component elements is known as "X-ray emission analysis."

In utilizing X-ray emission analysis techniques it has hitherto been customary to bombard but a single target area on the sample with an electron beam to produce the identifying X-rays. Consequently, unless the composition of the entire sample is homogeneous, information of limited utility is provided especially if a relatively large sample is analyzed.

Such previous attempts as were made to analyze different areas of a sample to provide more complete and thorough information about the composition were principally directed to systems for deflecting the electron beam so as to scan different areas of the sample. This approach, however, introduces so many difficulties in determining the wavelength of the radiations accurately that accurate measurement becomes extremely difficult. However, in accordance with this invention all of the above difficulties are obviated by mounting the sample for movement relative to the electron beam.

It is an object of this invention, therefore, to provide an apparatus for X-ray emission analysis having a movable sample holder to permit a point-by-point analysis of the entire sample.

The spectral distribution of the characteristic X-rays from the sample under analysis is determined by means of an instrument known as a crystal goniometer. The emitted X-rays are directed onto an analyzing crystal which diffracts X-rays in specific directions depending on the wave length. The diffraction of X-rays by such a crystal may be expressed by the mathematical form of Bragg's law:

$$n\lambda = 2d \sin \theta$$

where $n$ = whole integer number called the order of reflection or spectral order,
$d$ = the spacing between recurring similar layers of lattice particles in the crystal,
$\lambda$ = the wavelength of the X-rays, and
$\theta$ = the incident angle of the X-rays with the layers of lattice particles.

Thus, for any given incident angle $\theta$ the crystal only diffracts X-rays having a wavelength and angle of reflection corresponding to the given angle of incidence. By varying the position of the crystal with respect to the X-ray source to present various angles of incidence to the X-rays, while simultaneously moving an X-ray detecting means, such as a Geiger or proportional counter, to position it at all times at the proper corresponding angle of reflection, the incident angle $\theta_1$ for which a particular beam of X-ray is diffracted may be measured to determine the wavelength $\lambda_1$ of the X-rays.

It is immediately apparent that to insure optimum accuracy it is necessary that the source of X-rays, diffracting crystal, and the X-ray detector, always be located on a predetermined path in order that measurement be made with respect to a common reference point.

Consequently, in order to achieve accuracy along with the flexibility inherent in using a movable sample, it is necessary that the crystal and detector be maintained in a predetermined relationship with the X-ray source, irrespective of the position of the sample holder. Hence, movement of the goniometer assembly must be such that the electron beam and hence the X-ray source is always maintained on the predetermined path of the goniometer known as "Rowland's Circle."

Thus, it is an object of this invention to provide an X-ray emission analysis apparatus wherein X-rays emitted from samples are always positioned on the goniometer "Rowland's Circle" for all the positions of the sample holder.

A further object of this invention is to provide an apparatus for determining the point-by-point composition of a sample by X-ray emission analysis having movable yet vacuum tight sample holder housing assemblies.

Other objects and advantages of this invention will become apparent as the description of the invention proceeds.

In accord with the invention a movable, vacuum tight, sample holder and housing assembly is provided to select different areas of a sample as a target. Means is provided to move the housing in two dimensions in a given plane to permit scanning of the entire sample surface. A focussed electron beam strikes the sample at selected points to produce X-rays having a spectral distribution characteristic of the sample composition at the point of impingement.

A goniometer assembly is provided to intercept, diffract, and focus the X-rays at various positions along a predetermined path onto an X-ray detector in order to facilitate determination of the wavelengths of the X-rays. The goniometer drive assembly is so constructed that the crystal and detector are always maintained in the proper relationship to the electron beam irrespective of the position of the housing and sample holder. Thus, the point of impingement of the electron beam and, hence, the source of X-rays, is always maintained on the "Rowland's Circle" of the goniometer assembly and a highly accurate X-ray spectrometer is provided.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGURE 1 represents a perspective view of one embodiment of this invention;

FIGURE 2 is a sectional view taken along the lines 2—2 of FIGURE 1; and

FIGURE 3 is an alternative embodiment of a goniometer assembly which may be utilized in place of the one shown in FIGURE 1.

Referring now to FIGURE 1, there is illustrated a preferred embodiment of an apparatus for X-ray emission analysis, which includes a means to produce characteristic X-ray emission from a sample whose composition is to be determined, and a means for determining the wavelength of the emitted X-ray. There is provided a platform 1 which has an evacuated housing 2 fixed to the underside thereof. The housing 2, as will be explained in greater detail with reference to FIGURE 2, contains means to produce a focussed beam of electrons which impinges upon a sample to produce the characteristic X-ray emission.

Slideably mounted on the upper side of the platform 1 and communicating with the housing 2 through a passage in platform 1 is a sample and sample holder housing 3. A removable head cap 4 provides access to the interior of the housing 3 and rigidly supports a sample holder. An opening 5 having a window of X-ray permeable material such as beryllium or any other similar X-ray transmitting material is provided to facilitate passage of the X-rays out of the housing.

The movable housing 3 may be moved in two directions in the plane of the platform by means of two threaded shafts 6 fastened to a pair of brackets 7 on the housing 3. The motion of the housing 3 may be indicated by suitable feeler rods and dial indicators 8. In this manner the entire housing assembly 3 and the sample and sample holder contained therein may be moved relative to the electron beam causing it to impinge on various portions of the sample.

An optical arrangement is provided to allow observation of the sample and sample holder with the housing 3 to permit visual positioning of the sample with respect to the electron beam.

A high power light microscope 9 of long focal length is positioned on the platform to permit the operator to look inside of the housing and observe the sample and sample holder. A casing 45, extending obliquely from the main housing 3 and which may enclose an electric light bulb 44, provides a source of light which is projected into and illuminates the interior of the housing 3.

The X-rays from the sample 3 pass through the beryllium window in the opening 5 of the housing 3 onto a goniometer means 10 which determines the wavelengths of the emitted X-rays. To this end the goniometer 10, which includes a curved analyzing and diffracting crystal 11 retained in a crystal holder 12, is fastened to a rotatable center mounted crystal drive arm 13 which is mounted at one end thereof upon a caster assembly 14 which allows the entire arm and crystal holder assembly to move in a circular path. The crystal 11 acts as a diffraction grating and at different incident angles $\theta$ reflects X-ray radiations of different wavelengths. By moving the crystal 11 in a circular path, labeled in FIGURE 1 by the legend Rowland's Circle, the angle of incidence at which the X-rays strike can be varied through a range of values to determine at what angle $\theta$ the X-rays are diffracted and, hence, what their wavelength is.

Also positioned along the Rowland's Circle of the goniometer is an X-ray detecting means which intercepts the diffracted X-ray beam to produce an output signal representative thereof. To this end, an X-ray detector 15, which is preferably a Geiger-Mueller or proportional counter, is fastened to a supporting bracket 16 mounted for rotation on a pin 17.

A goniometer drive is provided which moves the crystal 11 and the detector 15 along Rowland's Circle so that the X-ray radiations from the housing 3 are intercepted at various positions and the detector is always positioned along the angle of reflection for every incident angle. Hence, the detector 15 and its supporting bracket 16 are fastened to a pin 17 which is rigidly secured to one end of a rotating arm 18 which is fixed to and driven from a drive shaft 19. The drive shaft 19 also supports the crystal drive arm 13 by being journaled in a bearing 20 retained in a crystal mounting bracket 21.

The drive shaft 19 is coupled through a worm gear 22 and gearings 23 and 24 to a manually operated crank 25 which transmits motion to the shaft 19 rotating the detector 15 along Rowland's Circle. An indicator dial 26 also driven from the crank 25 and calibrated in degrees indicates the angular position of the detector and crystal along the circle and provides an indication of the angle of incidence $\theta$ of the X-rays.

A mechanical linkage between the arm 18 and the crystal drive arm 13 moves the latter so that movement of the detector 15 is accompanied by a corresponding movement of the crystal 11 thereby always maintaining a fixed angular relationship between the incident angle $\theta$ of the X-rays on the crystal and the angle between crystal and detector. Hence, a curved follower arm 27 has one end fastened to the pin 17 and the other end to a slider link 28 riding in a slot 28' of the crystal drive arm 13 to move the arm 13 and the crystal 11 upon rotation of the detector 15. The follower arm 27 and the crystal drive arm 13 are so proportioned that the detector moves twice the distance along the circle as does the crystal 11 in order to maintain their predetermined angular relationship for all values of the incident angle $\theta$. Chain 47 together with pulleys 48 and 49 insures proper angular alignment of detector 15 with the reflective ray from crystal 11. Thus as the driving arm 18 moves the detector 15 on the path known as Rowland's Circle, bracket 21 on crystal arm 13 rotates drive pulley 48. This moves chain 47 which drives pulley 49 on pin 17 that rotates bracket 16 with detector 15. Therefore for every movement on Rowland's Circle of the detector 15, there is a corresponding angular alignment through pulleys 48 and 49 with chain 47 to keep detector 15 in contact with the reflective X-ray from crystal 11.

Since the housing 3 which contains the sample holder and sample is movable along the platform 1 in order to analyze various portions of the sample, it is necessary to maintain the goniometer drive linkage fixed with respect to the electron beam rather than with respect to the movable housing in order to maintain the X-ray source on the goniometer Rowland's Circle. A curved arm 29, one end of which is fastened to the slider link 28, has the other end linked to a rotatable mounting ring 30 which is always concentric with the axis of the electron beam. The mounting ring 30, as may be seen most clearly with reference to FIGURE 2, is mounted for movement on the inner race of a ball bearing 31 thus maintaining the arm 29 fixed with respect to the electron beam. Consequently, the goniometer drive mechanism operates in such a manner that the source of X-rays, diffracting crystal, and detector are always maintained on the goniometer Rowland's Circle for all positions.

In operation, the crank 25 imparts rotational movement to the drive shaft 19 moving the drive arm 18 and the detector around the circle. As the arm 18 rotates, linking arm 27, which is rigidly fastened thereto, follows and moves slider 28 in the slot 28' rotating the arm 13 and the crystal 11 to a new position corresponding to the counter position. The drive mechanism is so constructed that the arm 13 always positions the crystal 11 along the bisector of the angle established between the source, the crystal, and the counter, maintaining the counter aligned to intercept reflected X-rays for the particular incident angle $\theta$ of the crystal. Further bracket 21 on arm 13 rotates pulley 49 through pulley 48 and chain 47 which in turn angularly aligns detector 15 with the reflective X-ray from crystal 11. Hence, by observing from the dial 26 the positon along the circle at which an X-ray beam is intercepted by the counter, it is possible to ascertain the incident angle $\theta$ and the wavelength of the X-rays, from which data the composition of a portion of the sample may be determined.

FIGURE 2, which is a sectional view taken along the lines 2—2 of FIGURE 1, constitutes a more detailed showing of the electron beam source for producing the X-ray emission from the sample as well as the construction of the movable housing 3.

The housing 2, connected to a suitable vacuum system for maintaining the housing evacuated, is rigidly fastened to the underside of the platform 1 in any suitable manner. Positioned at the lower end of the housing is a filament and gun assembly 32 including apertured focussing and accelerating electrodes for producing a beam of electrons. The gun assembly 32 may be connected to any suitable source of operating potential (not illustrated) to emit, focus and accelerate a beam of electrons.

Positioned along the beam path is an electrostatic condenser lens assembly 33 comprising three spaced apertured metallic lens elements, the outer elements of which may be connected to the wall of the housing and the inner element connected to a suitable source of energizing voltage. An electrostatic field is produced which modifies the trajectories of the electrons passing therethrough to form the electrons into a beam of parallel or slightly converging rays. Because of this characteristic action the structure is termed a condenser lens.

The electron beam which has thus been modified by the condenser lens assembly is projected through a passageway 34 in the platform 1 and passes through an objective lens assembly 35 rigidly fastened to and mounted in the passage 34. The objective lens assembly 35 is fastened to the walls of the passageway 34 and extends upwardly into the housing 3 and comprises three apertured metallic lens elements connected to a suitable source of energizing voltage to establish an electrostatic field which focusses the electron beam onto a sample 36 mounted on a sample holder 37 contained in the housing.

In order to control the focussing of the electron beam properly and reduce effects of spherical aberration in the objective lens assembly, a beam limiting aperture 46 is positioned ahead of the objective lens assembly 35 to eliminate the marginal rays of the electron beam prior to passage of the rays through the objective lens assembly.

The housing 3 is slideably positioned on the upper surface of the platform 1 and is vacuum sealed by means of an O-ring seal 38 retained in a flange 39 of the housing 2, thus maintaining the integrity of the system vacuum while permitting movement of the entire housing 3.

The sample 36 is fastened to a sample holder 37 by means of set screws or other similar fastening means to facilitate removal thereof and the substitution of other samples. The sample holder has an angularly disposed surface so that X-rays emitted from the sample surface pass through the beryllium window 5 and out of the housing 3. The sample holder 37 is rigidly fastened to the head cap 4 by means of a sleeve 40 to which it is secured by means of set screws or the like and a conducting rod 41 extending through an insulating bushing 42 mounted in the head cap 4 which may be removed to provide access to the interior of the housing 3 to remove the sample holder. An adapter cap 43 is mounted on the end of the rod 41 and may be connected to an ammeter or other measuring instrument to provide a measure of the beam current striking the sample 36. It is apparent that the sample holder 37 is rigidly fastened to the housing 3 and insulated therefrom and, hence, may be moved relative to the electron beam by movement of the housing in order to achieve the point-by-point analysis of the sample.

As was adverted to briefly with reference to FIGURE 1, it is desirable to position the target visually with respect to the electron beam in order to examine the entire surface. In order to do so, a source of light must be provided to illuminate the interior of the housing 3. Hence, a source of light, such as an incandescent bulb 44, positioned in an obliquely extending housing 45, projects light through a suitable projecting lens onto the interior of the housing 3. The upper surface of the apertured lens member of the objective lens assembly 35 is highly polished in order to provide a reflecting surface for the light projected from the incandescent bulb and thus illuminates the surface of the sample and the sample holder. Reflected light from the sample is observed by means of the high powered light microscope 9 illustrated in FIGURE 1. The target area on the sample may be visually observed by the operator by one of the following mechanisms:

(1) The natural fluorescence of the target area,
(2) Burn spots on the target due to the electron beam, and
(3) Artificial fluorescence at the point of impingement of the electron beam induced by spreading a thin coating of fluorescent material over the sample surface.

In this manner the operator may easily observe precisely which portion of the sample is being analyzed.

In the X-ray analysis apparatus illustrated in FIGURE 1, the goniometer is of the type wherein the analyzing crystal, the detector tube, and source are mounted on the Rowland's Circle and are moved along that circle. However, it is apparent from mere observation that with such a construction there is a physical limitation on the positions which the analyzing crystal 11 may assume with respect to the source of X-rays produced within the housing 3 by virtue of the physical size and bulk of the instruments. Consequently, there is also a limitation on the incident angles of the X-rays which can be observed and, hence, the wavelengths of the X-rays which can be determined.

FIGURE 3 shows an alternative embodiment for mounting the goniometer elements which obviates some of these difficulties. That is, in FIGURE 3 the analyzing crystal is mounted at the center of the goniometer circle and rotated thereabout. Thus, a crystal and crystal holder assembly 50 having an analyzing crystal 51 mounted therein is rigidly positioned at the center point of the crystal assembly drive arm 13 and is rotated in conjunction with a counter arm by a driving assembly which is identical to that illustrated and described with reference to FIGURE 1. Thus, the X-rays emitted from the target and the housing 3 are caused to impinge upon the analyzing crystal 51 and are diffracted in a manner similar to that described with reference to FIGURE 1. The detector tube 15 is mounted on the circle and is driven by the drive mechanism to assume predetermined positions along a Rowland's Circle of varying radius in order to determine the wavelength of the emitted X-rays. It is obvious from examining the structure of FIGURE 3 that the analyzing crystal may be rotated through angles with respect to the X-ray source which would be physically impossible were the analyzing crystal mounted on the same circle as the X-ray source. Hence, for examining certain compositions which emit X-rays in certain predetermined wavelength bands, it may be more desirable to utilize a goniometer assembly of the type illustrated in FIGURE 3.

It is apparent from the preceding description that applicants have provided an apparatus for determining the composition of materials by X-ray emission analysis wherein the sample to be examined may be analyzed discretely over the entire surface by moving the sample with respect to an electron beam, while maintaining the X-ray source fixed relative to the elements of the goniometer assembly, thus insuring optimum accuracy in determining the wavelength of the emitted X-rays.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What we claim as new and desire to secure by Letters Patent of the United States is:

1. In an X-ray emission spectrometer, the combination comprising a sample holder assembly adapted to retain samples the composition of which is to be determined, means to produce X-ray emission spectra from samples retained in said holder assembly which spectra are characteristic of the sample composition, means to move said sample holder assembly to produce said X-ray spectra selectively from different portions of said sample, and goniometer means selectively movable over a predetermined path to intercept and determine the wavelength of the X-rays emitted from said sample to ascertain the composition of the point on the sample, and means linked to said goniometer means to maintain it in a predetermined positional relationship to the point of X-ray emission irrespective of the position of said sample holder assembly said last named means including an arm rotatably and translatably mounted about a path that is a fixed distance from the point of X-ray emission on said sample.

2. In an X-ray emission spectrometer, the combination comprising means to produce characteristic X-ray emission spectra from a sample of material being analyzed from a sample, means to move said sample to produce X-rays from different points on the sample, crystal means to diffract and focus emitted X-rays of different wavelengths at different positions along a predetermined path of travel of said crystal means, detecting means on said predetermined path to intercept and detect said diffracted X-rays, drive means to position said crystal and said detecting means along said predetermined path so that said detecting means is always positioned to intercept said diffracted X-rays for every crystal position, and a link arm coupled to said drive means and adapted to rotate about the point on said sample from which X-rays are emitted whereby said X-rays are emitted from a point on said predetermined path irrespective of the position of said sample and the point thereon being examined.

3. In an X-ray emission spectrometer, the combination comprising means defining a vacuum tight chamber adapted to hold a sample the composition of which is to be determined by the characteristic X-ray spectra of its component elements, means to produce an electron beam which impinges on said sample to produce said X-ray spectra, means to move said sample with respect to said electron beam to determine the point-by-point composition of said sample, goniometer means to determine the spectral distribution of the X-rays from said sample to ascertain the composition of the samples, and linking means coupled to said goniometer means adapted to rotate and translate along a concentric path about the axis of said electron beam to maintain said goniometer means in a predetermined positional relationship with said electron beam irrespective of the position of the sample retaining means.

4. In an apparatus for determining the composition of a material by its X-ray emission characteristic, the combination comprising a sample holder rigidly mounted in a vacuum tight housing, means to produce a focused electron beam which impinges on a sample retained in said holder to produce X-ray spectra characteristics of the sample component elements at the point of impingement, means to move said sample holder with respect to said beam to produce X-rays from different portions of said sample, means to intercept the X-rays emitted from said sample to determine the spectral distribution of the X-rays, goniometer drive means to move said means to various points along a predetermined path, and an arm mounted for rotational and translational movement on a concentric path about the axis of said electron beam linked to said drive means so that the X-rays are always emitted from a point lying on said predetermined path irrespective of the position of the housing or the sample holder.

5. In an apparatus for determining the composition of a material by its X-ray emission characteristic, the combination comprising a sample holder rigidly mounted in a vacuum tight housing, means to produce a focused electron beam which impinges on a sample retained in said holder to produce X-ray spectra characteristics of the sample component elements at the point of impingement, means to move said sample holder with respect to said beam to produce X-rays from different portions of said sample, crystal goniometer means to intercept the X-rays emitted from said sample to determine the spectral distribution of the X-rays, goniometer drive means to move said goniometer means to various points along a predetermined path, a rotatable mounting ring concentric with the axis of said electron beam, an arm fastened to said mounting ring and linked to said drive means whereby said crystal goniometer and the X-rays emitted from said sample always lie on said predetermined path irrespective of the position of said housing.

6. In an X-ray emission spectrometer the combination comprising a sample holder assembly for movably supporting a sample to be analyzed, a finely focused electron beam adapted to impinge on the sample for producing X-rays characteristic of the sample composition at the point of impingement, means to analyze the spectral composition of said X-rays including movable X-ray diffracting and detecting means, drive means for said diffracting and detecting means for simultaneously moving said means and maintaining fixed angular relationship therebetween at various positions, and linking means coupled to said drive means and mounted for rotatable and translatable movement on a concentric path about said electron beam to maintain said beam, said diffracting and said detecting means in a predetermined relationship irrespective of the position of said movable sample holder.

7. In an X-ray emission spectrometer the combination comprising a sample holder assembly for movably supporting a sample to be analyzed, a finely focused beam of electrons adapted to impinge on the sample for producing X-rays characteristic of the sample composition at the point of impingement, a goniometer assembly for determining the spectral distribution of the X-rays emitted from said sample, said goniometer means including a movable X-ray diffracting means, a movable X-ray detecting means, drive means for moving said diffracting and detecting means so that said detecting means moves twice the distance of said diffracting means to maintain a fixed angular relationship therebetween for all positions, and a linking means coupled to said drive means and rotatably and translatably mounted a fixed distance from said electron beam to maintain said electron beam and said detecting and diffracting means in a predetermined positional relationship.

8. In an X-ray emission spectrometer for determining the point by point composition of a sample by its characteristic X-ray emission, means to produce a finely focused electron beam adapted to impinge on a sample for producing X-rays characteristic of the sample composition, a sample holder assembly movably disposed with respect to said electron beam for scanning the surface of said samples, a goniometer means for determining the spectral distribution of the X-rays emitted from the sample including a movable X-ray diffracting means mounted on a movable support means, X-ray detecting means, and drive means for rotating said diffracting and detecting means including means for so constraining movement of said diffracting means to maintain a predetermined angular relationship therebetween said constraining means including a pair of arms slideably connected to said support means for positioning said diffracting means, one of said arms also being mounted for rotational and translational movement along a concentric path about the axis of said electron beam.

9. In an X-ray emission spectrometer the combination comprising a movable sample holder, a beam of finely focused electrons for striking said sample and producing X-rays characteristic of the composition of the sample, a goniometer means for selecting, focusing and detecting the wave lengths of the emitted X-rays, goniometer drive means for producing movement of said selecting, focusing and detecting means about at least one fixed position on a great circle including the axis of said electron beam, said drive means including an arm coupled to said drive means and mounted for rotational movement about the axis of said electron beam.

(References on following page)

References Cited in the file of this patent

UNITED STATES PATENTS

| | | |
|---|---|---|
| 2,386,785 | Friedman | Oct. 16, 1945 |
| 2,418,029 | Hillier | Mar. 25, 1947 |
| 2,474,835 | Friedman | July 5, 1949 |
| 2,490,673 | Champaygne et al. | Dec. 6, 1949 |
| 2,540,821 | Harker | Feb. 6, 1951 |
| 2,648,011 | Good | Aug. 4, 1953 |
| 2,709,752 | Parrish et al. | May 31, 1955 |
| 2,802,110 | Kenji Kazato et al. | Aug. 6, 1957 |
| 2,829,261 | Lowitzsch et al. | Apr. 1, 1958 |
| 2,898,469 | Rose | Aug. 4, 1959 |